Figure 5:
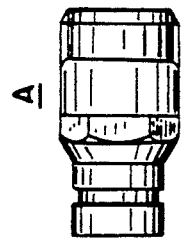

United States Patent [19]

Broere

[11] Patent Number: 5,139,287
[45] Date of Patent: Aug. 18, 1992

[54] COUPLING UNIT

[75] Inventor: Jaap J. Broere, Amersfoort, Netherlands

[73] Assignee: Applied Power Inc., Butler, Wis.

[21] Appl. No.: 549,005

[22] PCT Filed: Dec. 14, 1989

[86] PCT No.: PCT/EP89/01551

§ 371 Date: Oct. 15, 1990

§ 102(e) Date: Oct. 15, 1990

[87] PCT Pub. No.: WO90/07078

PCT Pub. Date: Jun. 28, 1990

[30] Foreign Application Priority Data

Dec. 16, 1988 [DE] Fed. Rep. of Germany ....... 3842500

[51] Int. Cl.$^5$ .............................................. F16L 35/00
[52] U.S. Cl. .................................. 285/26; 285/137.1; 285/101; 285/224
[58] Field of Search ..................... 285/25, 26, 28, 29, 285/137.1, 101, 102, 224, 902, 920

[56] References Cited

U.S. PATENT DOCUMENTS

| 3,677,577 | 7/1972 | Krauer et al. | 285/137.1 |
| 3,774,636 | 11/1973 | Arita | 285/24 X |
| 4,111,463 | 9/1978 | McFadden | 285/25 |
| 4,411,317 | 10/1983 | Gieswin | 166/347 |
| 4,611,831 | 9/1986 | Truchet | 285/26 |
| 4,915,419 | 4/1990 | Smith, III | 285/137.1 X |

FOREIGN PATENT DOCUMENTS 168333 1/1986 European Pat. Off. .
2077872 12/1981 United Kingdom .

Primary Examiner—Randolph A. Reese
Assistant Examiner—Heather Chun
Attorney, Agent, or Firm—Quarles & Brady

[57] ABSTRACT

Coupling unit for releasably connecting fluid lines in or on two parts whose relative position is variable. In order to ensure reliable centering of the ends of the fluid lines to be connected while avoiding excessively high shear stresses, a distance plate (1) is arranged between the parts (M and W) containing the fluid lines (L and K, respectively) to be connected. The distance plate (1) is fastened in an axially mobile manner to the first part (M) by means of at least one guide rod (F) fastened to the latter and whose distance from the other part can be varied by means of at least one piston rod (S) arranged in the guide rod (F). A number of bushings (3) equal to the number of line connections to be made are housed in axial recesses (2) in the distance plate (1). The bushings (3) are held in their respective recesses (2) with axial and radial play, are connected to one part (M) by a mobile flexible tubular line (L) and are associated with the other part (W) by a fixed connecting sleeve (A).

7 Claims, 2 Drawing Sheets

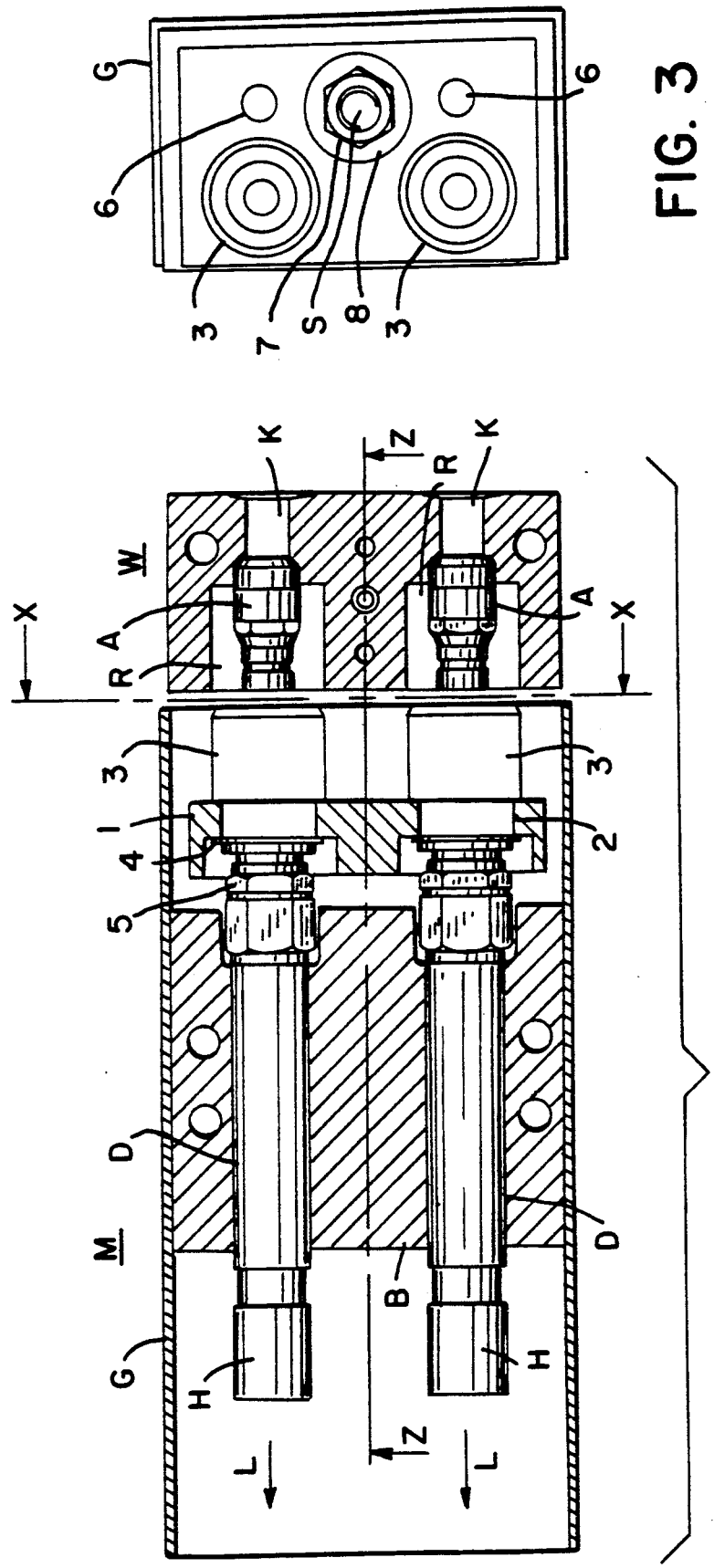

COUPLING UNIT

The invention relates to a coupling unit for releasably connecting fluid lines in two components that can vary their relative positioning, as specified in the preamble of patent claim 1.

Machines that supply hydraulic fluid to various points during their operation have a plurality of fluid lines that supply and drain off hydraulic fluid to or from the respective points of application. But if the individual components of the machine in which such fluid lines run need to be exchanged during a switch for another mode of operation, for example during machinery conversion, then it is desirable to be able to reliably and quickly disconnect the fluid lines from one another and, if required, join them together in another manner, whereby the intent is to automate the process to the maximal extent possible.

A fundamental problem herein consists of the fact that, when the fluid lines are joined into one line, the bushing on the end of one line must be reliably centered on the connection sleeve on the end of the other line, while the degree of the shearing forces exerted on the joined components may not reach unacceptably high values. In this regard, the previously known coupling designs, wherein the bushing that is rigidly connected to one component comes into direct contact with the connection sleeve that is also rigidly arranged with the other component, is not completely satisfactory.

The invention therefore is assigned the basic task of providing a coupling unit of the type mentioned in the introduction, which simultaneously fulfills both of the mentioned, opposing requirements to a sufficient degree.

The task as defined is accomplished according to the invention by means of a coupling unit as indicated in patent claim 1, and advantageous embodiments and further developments of the invention are derived from the subclaims.

The basic principle of the invention concerns the quasi-suspended or floating arrangement of the distance plate, which simultaneously assumes the function of adjusting the centering and reducing shear forces. To accomplish this, the distance plate forms a mounting support for the bushing, permitting sufficient movement in an axial and radial direction and also assuring reliable contact with the connecting sleeve in order to establish tight-sealing line connections.

Figure 4:
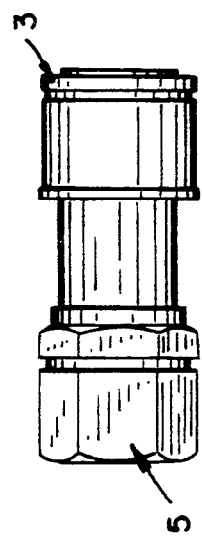
Figure 2:
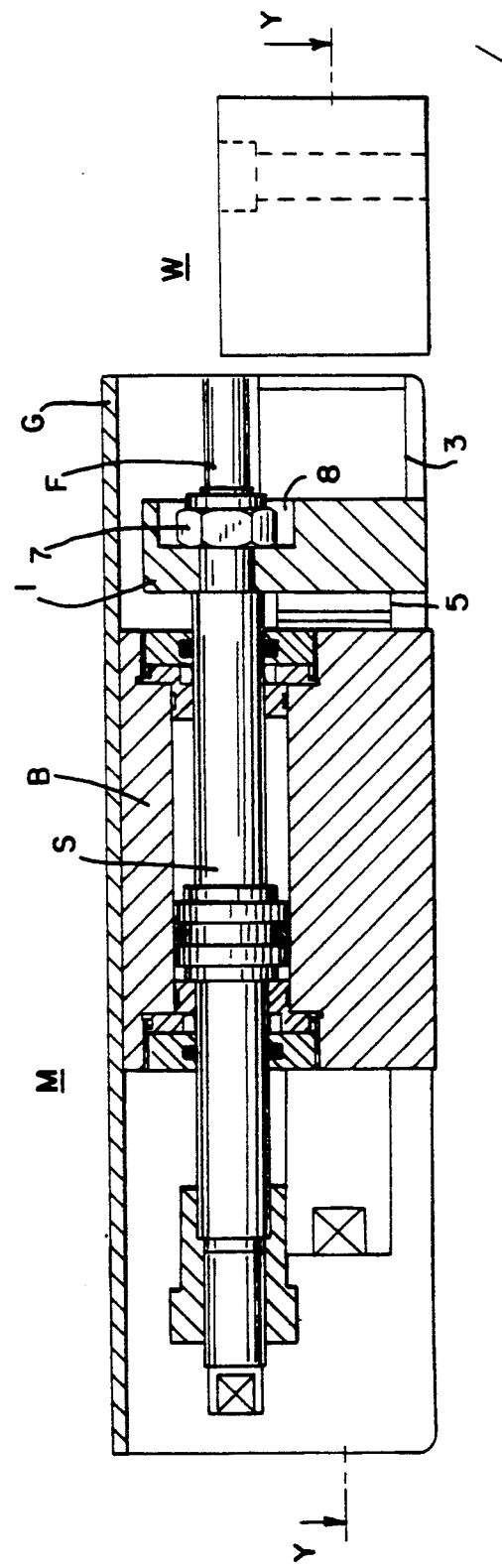

For a more detailed explanation of the invention and the advantages associated with it, reference is now made to the drawings, in which a preferred exemplified embodiment of the invention is illustrated. Shown in the drawings are:

FIG. 1 a coupling unit according to the invention in connection with a first component of a machine, and a second component that can change its relative position, in an axial section along the section line Y-Y in FIG. 2, FIG. 2 a representation of FIG. 1 in another axial section along the section line Z-Z in FIG. 1, FIG. 3 a view of the coupling unit distance plate or FIG. 1 as seen in the direction indicated by the line X-X in FIG. 1, FIG. 4 a coupling unit bushing from FIGS. 1 to 3, with its adaptor, in a greatly enlarged representation, and FIG. 5 a connection piece that is associated with this bushing in a similar representation.

The representations in FIGS. 1 and 2 respectively show a machine frame M on the left and a tool W on the right that acts in conjunction with it and which can, if desired, be exchanged for another component. The machine frame M as well as the tool W contain fluid lines to transport hydraulic fluid and/or lubricating oil, which must be connected in pairs to one another by means of a coupling unit, so that the tool W can be supplied from the machinery frame. Such fluid lines are illustrated in the drawing as the fixed channels K in tool W and as mobile flexible tubular lines L on the machine frame M, respectively indicated by arrows. The channels K in tool W continue toward the machine frame M through the connecting sleeves A, each of which is rigidly arranged so as to be centered in an annular space R that is open toward the machine frame. The flexible tubular lines L on the machine frame M are connected to intermediate sleeves H, which are located in a base body B of the machine frame M that is surrounded by an outer protective housing G, with each intermediate sleeve H being included in its own axial passage D with radial play and in which movement can occur in an axial direction.

A coupling unit is provided as a connection element for the various fluid lines on the machine frame M on the one hand, and for the tool W on the other hand, said coupling unit allowing the establishment of a fluid connection between all of the relevant fluid line pairs during automatic operation.

This coupling unit first features a distance plate 1 which, in the represented exemplified embodiment, is guided in an axially movable manner on two guide rods F fastened to the machine frame M, said guide rods each passing through the distance plate 1 in its own axial bore hole 6, as can most clearly be seen in FIG. 3. To move the distance plate 1 axially toward or respectively away from tool W, a hydraulic mechanism with an axially movable piston rod S is provided in the machine frame M, the free end of which is fastened in a relief 8 on the distance plate 1 with the help of a nut 7, as is represented in FIGS. 2 and 3. The combination of the guide rods F on the one hand and the rod S on the other hand permits the exact axial movement of the distance plate 1 and the components that it bears.

The distance plate 1 contains an individual bushing 3, representing the actual connecting element, for each connection which is to be established, said bushings in turn being seated in their own axial recesses 2 in the distance plate 1 in an axial extension to the axial passages D in the base body B of the machine frame M, and each being held there with axial and radial play by means of its own retainer ring 4. Each bushing 3 is screwed onto the associated intermediate sleeve H on the machine frame M respectively by an adapter 5 that extends into the corresponding passage D, and is thereby connected with the associated flexible tubular line L in a fluid-tight manner. As a result of this type of mounting support and connection, the bushings 3 together with the distance plate 1 can be adjusted in an axial direction, but thereby possessing a certain ability to move in an axial as well as a radial direction which, as a result of its entry into the respective surrounding annular space R, permits it to be centered on the respectively associated connecting sleeve, A on the tool W. The bushings 3 project from the front face of the distance plate 1 on the side of the distance plate 1 that faces the tool W, and at that point they feature an outer diameter which permits entry into the annular space R around the respectively associated connecting sleeves A, centering onto them. The inside diameters of the bushings 3 are adapted to the respectively associated connecting sleeves A on the tool W, as can best be seen in FIGS. 4 and 5, which show a single bushing 3 with its adapter 5, and a single connecting sleeve A, respectively. The bushings 3 are thereby slid onto the respective associated connecting sleeves A until they are securely engaged, whereby sealing 0-rings provide a fluid-tight connection to the extent required. The appropriate axial adjustment of the distance plate 1 and the bushing mounting in it permit a sealed connection between the hose lines L on the machine frame M on the one hand and the channels K in the tool on the other hand, whereby the axial and radial movement of the bushing 3 in the respective recess 2 in the distance plate 1, or of the adapter 5 and the intermediate sleeve H in the passages D in the base body B of the machine frame M assures the reliable centering of the bushing 3 on its associated connecting sleeve A on the tool W, without excessively high shear forces acting on any of the components.

As is shown in the present specification, the core of the invention consists of the arrangement of the bushings 3 in the distance plate 1 in a quasi-suspended or floating manner, whereby the bushings 3 can enter centered into the annular space R around the individual connecting sleeves A on tool W and, as a result of the suitable dimensioning of their axial length and inside diameter, permit the fluid-tight connection to the connecting sleeves A, whereby the coupling unit as a whole provides for the supply of operating fluid from the machine frame M to the tool W without loss due to leaks, without the necessity for excessively high shear stresses.

I claim:

1. Coupling unit for releasably connecting fluid lines, each fluid line forming part of one or the other one of two components which may alter their relative positioning with respect to one another, by inserting a connecting sleeve of one component into a bushing of the other component, said connecting sleeve and said bushing engaging to establish a seal, characterized by a distance plate supported so as to be axially movable by means of at least one guide rod fastened to said one component and by means of at least one piston rod provided in said one component, said distance plate being axially adjustable in a direction toward or away from the other component, and a plurality of bushings corresponding in number to a number of line connections that are to be established between the two components, each of said bushings connected to said distance plate with axial and radial play in a respective recess provided in the distance plate, and said bushings connected to a mobile flexible tubular line on one component and for connection to a rigidly arranged connecting sleeve on the other component.

2. Coupling unit according to claim 1, wherein said bushings project toward the other component from said distance plate, and have an outer diameter that permits said bushings to be centered in an annular space that surrounds each respective connecting sleeve on the other component, and have a suitable inside diameter for placement onto each respective connecting sleeve up to the point of engagement to form a seal between the bushings and each respective sleeve.

3. Coupling unit according to claim 2, characterized by the fact that each bushing is supported in its recess in the distance plate by means of a retaining ring.

4. Coupling unit according to claim 2, characterized by the fact that the distance plate carries the guide rod in an axial bore hole that penetrates it, and is firmly screwed onto the piston rod by means of a nut.

5. Coupling unit according to claim 2, characterized by the fact that each bushing is connected to its associated flexible tubular line by a respective adapter that is guided so as to slide axially and move radially in its own passage in one of the components.

6. Coupling unit according to claim 5, characterized by the fact that each adapter is connected to the associated flexible tubular line by means of the respective tube shaped intermediate sleeve that is also guided in the corresponding passage so as to slide axially and move radially.

7. Coupling unit according to claim 6 characterized by the fact that each adapter is firmly screwed onto the associated intermediate sleeve.

* * * * *